United States Patent [19]
Yeon et al.

[11] Patent Number: 5,191,484
[45] Date of Patent: Mar. 2, 1993

[54] OPTICAL PICK-UP OBJECTIVE DRIVING APPARATUS

[75] Inventors: Jye-Sye Yeon; Jong-Jin Lee, both of Suwon; Ho-Cheol Lee, Seoul, all of Rep. of Korea

[73] Assignee: Samsung Electronics Co., Ltd., Suwon, Rep. of Korea

[21] Appl. No.: 828,120

[22] Filed: Jan. 30, 1992

[30] Foreign Application Priority Data

Jan. 31, 1991 [KR] Rep. of Korea ............. 91-1692

[51] Int. Cl.⁵ .................................... G02B 7/02
[52] U.S. Cl. ......................... 359/824; 369/44.14; 359/814
[58] Field of Search ............. 359/813, 814, 823, 824, 359/819; 369/43, 44.11, 44.14, 44.32, 44.15, 44.22

[56] References Cited

U.S. PATENT DOCUMENTS

| | | | |
|---|---|---|---|
| 4,790,628 | 12/1988 | Nanno et al. | 359/824 |
| 4,863,240 | 9/1989 | Nakajima et al. | 359/824 |
| 4,878,214 | 10/1989 | Hinotani | 359/814 |
| 4,998,802 | 3/1991 | Kasuga et al. | 359/814 |
| 5,018,836 | 5/1991 | Noda et al. | 359/814 |

FOREIGN PATENT DOCUMENTS 62-40627 2/1987 Japan .

Primary Examiner—Loha Ben
Attorney, Agent, or Firm—Burns, Doane, Swecker & Mathis

[57] ABSTRACT

An optical pick-up objective lens driving apparatus comprises a rectangular moving member mounted for movement relative to an iron-core member in rectilinear focusing and tracking directions, respectively. The moving member carries focusing and tracking coils, and a lens. Magnetic pieces are disposed at respective corners of the moving member in opposing spacial relationship to magnetic plates of the iron core member to create a restoring force which biases the moving member to a pre-set position. The lens is mounted over a center of weight of the moving member.

5 Claims, 1 Drawing Sheet

OPTICAL PICK-UP OBJECTIVE DRIVING APPARATUS

FIELD OF THE INVENTION

The present invention relates to an optical pick-up objective lens driving apparatus which can stabilize the tracking control, wherein an optical pick-up apparatus records and reproduces, using light beam, such information as the audio and/or video signals onto the fast-moving media.

DESCRIPTION OF THE PRIOR ART

In the present day industrial fields, use is more and more frequently being made of optical pick-up apparatus employing light beams because the optical recording and reproducing apparatus can record and reproduce the provided the use of light, wherein a concentration of light beams irradiated onto the media is done generally by the objective lenses.

In other words, by driving the objective lenses along optical axes or directions which are crossed, the projected concentration of light or focusing attained.

This way of concentrating light beams however causes great influence on the performance of the optical apparatus, for which a lot of objective lens driving devices for accurate and effective light beam concentration have been developed for practical uses so far.

For instance only, the usual optical pick-up apparatus has a driving device which generates a driving force by an electric magnet and permanent magnet. This driving device is composed of a moving member and iron core members having at least in one direction a driving coil that has different lines of magnetic force along the optical axis and tracking directions. This device moves the objective lenses in a straight vertical focusing direction and a horizontal tracking direction perpendicular to the focusing direction and thus controls the focusing and tracking automatically in response to the electric current flow.

The driving device of this kind for objective lens comes in various styles. One example of this kind is that by mounting the object glass on the driving members, the projected purposes is attained and this kind of conventional technique is well described in U.S. Pat. No. 4,790,628 and Japan Pat. Laid-Open No. 62-40627.

That is to say, the object can be achieved by supporting the objective lens-mounted moving members with a plate spring device and a slide connection made of plastic, or by installing the moving member on the iron core member so that the moving member can freely rotate without any specific supporting device wherein the moving member can have its rotational center at the middle of the iron core member, and at the same time the objective lens can be spaced from that rotational center.

In this connection, referring to Japan Pat. Laid-Open No. 62-40627 regarding the driving device of the object glass (objective lens), it has a moving member being equipped with tracking and focusing drive coils cooperating with an iron core member having magnetic materials on opposing inner walls.

The moving member is arranged to move in the horizontal direction by a hinge part 15 and in the direction against the bias of a plate spring device enabling the desired drive control to be achieved by the control signal output from separate control circuitry while interrupting the electric supply of respective drive coils of the moving members. Here, the moving member moves along an X-axis (light axis direction) and Y-axis (tracking direction). The lens is positioned at one end of the moving member, and the plate spring arrangement, formed by upper and lower spring plates, is disposed at an opposite end of the moving member.

In this case because the object glass is not located over the center of weight of the moving system, vibration due to an eccentric loading, occurs causing a great influence on the movement of the objective lens resulting from the mass of the spring plate device and thus pushing up the production cost along with complexity of construction and varieties of involved components, which is one of the drawbacks.

Reference is made to the conventional technique described in U.S. Pat. No. 4,790,628 wherein the objective lens is installed at a position spaced from the weight center of the driving member, resulting in the vibration as mentioned above, instability in tracking, uneasiness in the area of processing and other discrepancies.

The present invention was so made in consideration of the above-cited problems and achieves the advantage of reducing the vibration to a minimum and providing an optical pick-up objective lens with improved stability and accuracy in.

Another advantage of the present invention is that the voluminous size can be reduced by simplification and at the same time, the simple and effective optical objective driving device can be provided.

SUMMARY OF THE PREFERRED EMBODIMENTS OF THE INVENTION

The object of the present invention can be accomplished by providing an objective lens driving device with mutually facing magnetic plates on the inner of both sides, has iron core member having one set of matching, spaced-out iron core bars and an oblong-shaped moving member is installed on the iron core member for easy movement.

The moving member is composed of through-hole parts thru which an iron core bar of the iron core member is inserted and an objective lens is mounted on its upper center.

The said moving member is also equipped with focusing drive coil and tracking drive coil on its main wall part. It also has magnetic pieces on four side corners of each wall facing the magnetic plates of the iron core member, which gives stability onto the focusing and tracking control as the object glass is placed in the center of the movement area.

BRIEF DESCRIPTION OF THE DRAWING

For a fuller understanding of the nature and objects of the invention, reference should be made to the following accompanying drawings in which.

DETAILED DESCRIPTION OF THE PREFERRED EMBODIMENTS

Figure 1:
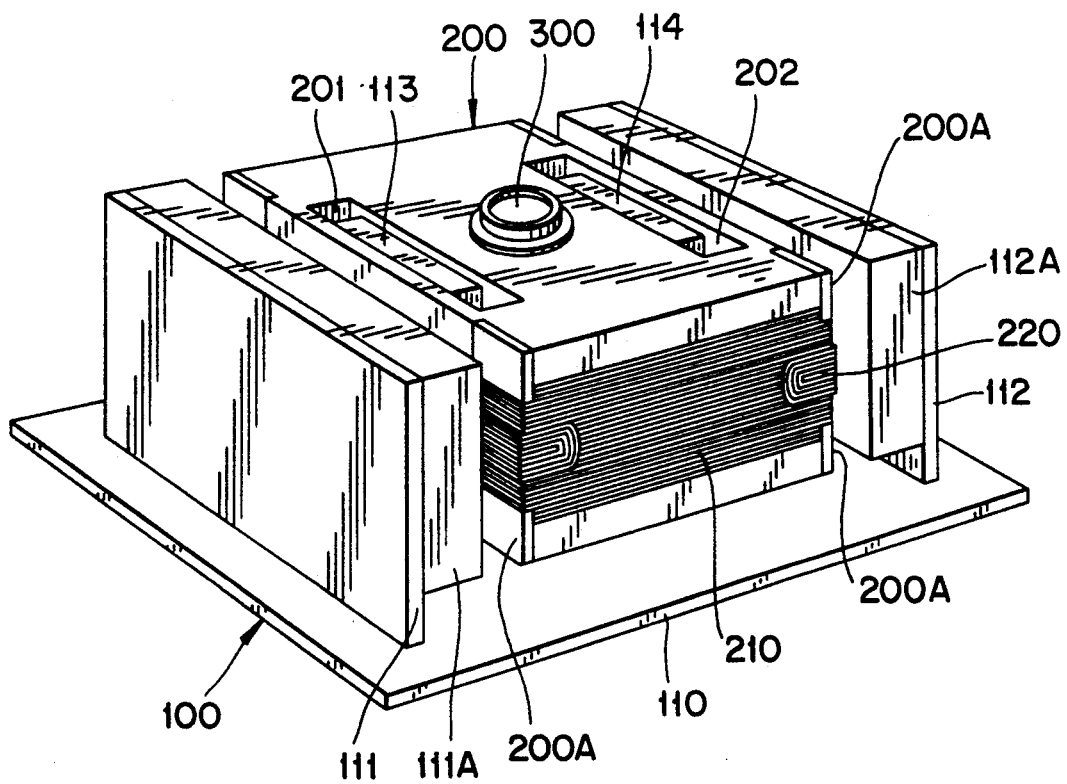
FIG. 1 is a perspective view of a driving apparatus for the optical pick-up objective lens in accordance with the principles of the present invention.

The foregoing and other advantages and features of the invention will become apparent from the following features of the preferred embodiment when considered together with the illustrations in the accompanying drawing which include the following figures:

FIG. 1 shows an objective lens driving device for the optical recording and reproducing apparatus according to the principles of the present invention. The objective lens driving device comprises iron core member 100 and moving member 200.

The iron core member is composed of one set of parallel, vertical main wall parts 111, 112 on a square shaped base. On the inner sides of the main wall parts lie magnetic plates 111A, 112A facing each other and having the same polarity.

The moving member 200 is composed of a generally rectangular oblong-shaped body and is so made to be of smaller size than the spacing between the main wall parts 111, 112 of the iron core member 100 so that it can move freely within the iron core member.

The moving member 200 is also equipped with one set of through-holes 201, 202.

The through-holes receive the iron core bars 113, 114 and at the same time provide a driving space. These through-hole are parallel to the main wall parts 111, 112 of the iron core member 100, which furnishes the driving space for driving the moving member 200 in the tracking direction but restricts the driving in a direction perpendicular to the wall parts 111, 112.

In other words, the space between the two through-holes 201, 202 and the gap between the iron core bars 113, 114 have the same width so that the moving member is restricted from moving perpendicular to the main two wall parts 111, 112, and thus moves linearly in the focusing and tracking directions, each of which is parallel to the wall parts 111, 112. So the moving member is so mounted to move in the focusing or tracking direction only, whereby unnecessary driving of the moving member is excluded and the stability of control is provided.

The outer wall of the moving member 200 is surrounded by a focusing drive coil 210, and at its four corners it is overlain by a tracking drive coil 220. These focusing and tracking drive coils 210, 220 operate according to the separate control apparatus in the current direction supplied alternatively.

Further detailed explanation is that, for instance, if the electric current is applied to the focusing drive coil 210 in a certain direction, a magnetic force occurs in a direction perpendicular to the electric current. A vertical motion is produced by this magnetic force in cooperation with the electric flux of the magnetic plates 111A, 112A. The moving member 200 obtains the desired focusing by driving in straight vertical lines along the iron core bars 113, 114.

In the current is supplied alternatively from the control apparatus to the tracking drive coil 220, the moving member 200 will move in a reciprocation tracking motion horizontally on the iron core member 100 parallel to the walls 111, 112 by the tracking drive coil 220 and the electric flux of the magnetic plates 111A, 112A.

Now, the moving member 200, as explained above, as guided in reciprocating motion by the cooperation of the through-holes 201, 202 and the core bars 113, 114.

In the meantime, the restoring force and sustaining force are supplied by the magnetic pieces 200A which are mounted on four side corners of the moving member 200 facing the main wall parts 111, 112.

To explain in detailed aspects, after the moving member is adjusted in the prescribed direction by the focusing or tracking drive coil, and then once the adjusted condition is released, the magnetic plates 111A, 112A of the main wall parts and the magnetic pieces 200A of the moving member cooperate to return the moving member to the original position which is sustained by its electric flux.

The objective lens 300 is mounted at the center of the top surface of the moving member and thus is positioned over the center of weight of the moving member.

Figure 2:
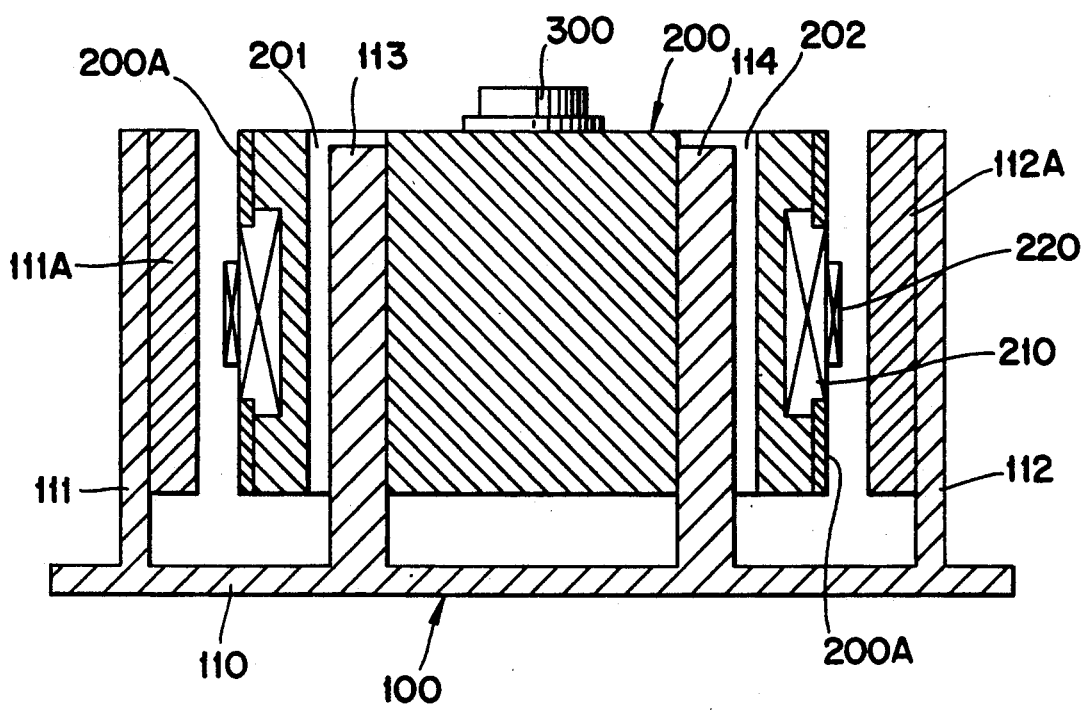
FIG. 2 is a cross-sectional view of the driving apparatus for the optical pick-up objective lens according to the principles of the invention.

Now referring to FIG. 1 and FIG. 2 the optical recording and operational effects of the objective lens driving device for the reproductive apparatus are explained hereunder.

The conventional moving member used to have separate supporting structure for buttress, resulting in unnecessary built-in vibration caused by the material properties of the supporting structure itself. However the moving member improved according to the principles of the present invention has no separate supporting structure and is so constructed to have restricted driving in a certain direction by the through-holes 201, 202 so that unnecessary drive is controlled, driving is stabilized and accurate speedy operation can be maintained.

Moreover the moving member 200 and the iron core member 100 are to have an effect of combining the two members thru the electric flux without resort to the separate support, thus simplifying the structure and achieving the advantage of miniaturizing the products.

And then, the objective lens 300 is situated on the center of weight for the movement area, in other words, it is located on the center of weight of the moving member 200, maintaining the stability of the movement area, thus improving the stability on the focusing and tracking operation plus upgrading product performances.

What is claimed is:

1. An optical pick-up objective driving apparatus comprising an iron core member having magnetic plates, a generally rectangular moving member mounted for movement relative to said iron core member in a rectilinear focusing direction and a rectilinear tracking direction, and a lens mounted on said moving member, said moving member including a focusing drive coil and a tracking drive coil for moving said moving member in said focusing and tracking directions, respectively, and restoring means for biasing said moving member toward a pre-set position, said restoring means comprising magnetic pieces disposed at respective corners of said moving member and facing said magnetic plates.

2. Apparatus according to claim 1, wherein said lens is mounted over a center of weight of said moving member.

3. Apparatus according to claim 1, wherein said iron core member includes guide means constraining tracking movement of said moving member to a direction extending generally parallel to said magnetic plates.

4. Apparatus according to claim 3, wherein said guide means comprises iron core bars which project through holes in said moving member.

5. Apparatus according to claim 3, wherein said lens is mounted over a center of gravity of said moving member.

* * * * *